(12) United States Patent
Kim et al.

(10) Patent No.: US 8,386,696 B2
(45) Date of Patent: Feb. 26, 2013

(54) METHODS OF WRITING PARTIAL PAGE DATA IN A NON-VOLATILE MEMORY DEVICE

(75) Inventors: Jin-hyuk Kim, Gyeonggi-do (KR); Chang-eun Choi, Seoul (KR); Young-gon Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1169 days.

(21) Appl. No.: 12/069,764

(22) Filed: Feb. 13, 2008

(65) Prior Publication Data

US 2008/0195804 A1    Aug. 14, 2008

(30) Foreign Application Priority Data

Feb. 13, 2007  (KR) .................. 10-2007-0015091

(51) Int. Cl.
*G06F 12/00* (2006.01)
*G06F 13/00* (2006.01)
*G06F 13/28* (2006.01)

(52) U.S. Cl. ......... 711/103; 711/171; 711/165; 711/118
(58) Field of Classification Search .................. 711/103
See application file for complete search history.

(56) References Cited

U.S. PATENT DOCUMENTS

| 2005/0030791 | A1* | 2/2005 | Liang et al. ............... 365/185.11 |
| 2006/0136676 | A1* | 6/2006 | Park et al. ..................... 711/144 |
| 2006/0155920 | A1* | 7/2006 | Smith et al. .................... 711/103 |
| 2008/0037321 | A1* | 2/2008 | Luo et al. ................. 365/185.03 |
| 2008/0058961 | A1* | 3/2008 | Biberdorf et al. ................. 700/5 |
| 2009/0055574 | A1* | 2/2009 | Chen et al. ..................... 711/103 |

FOREIGN PATENT DOCUMENTS

| JP | 09-282221 | 10/1997 |
| JP | 11-203885 | 7/1999 |
| JP | 2005-182538 | 7/2005 |

* cited by examiner

*Primary Examiner* — Christian P Chace
*Assistant Examiner* — Prasith Thammavong
(74) *Attorney, Agent, or Firm* — Myers Bigel Sibley & Sajovec, P.A.

(57) ABSTRACT

A method of writing partial page data in a non-volatile memory device includes, reading data from a second block when the size of a last page of data to be written in a page of a first block is smaller than a size of the page of the first block, wherein a size of the read data is given by the size of the page of the first block minus the size of the last page of data; storing together data of the last page and the data read from the second block in a buffer; and writing the data stored in the buffer in the first block.

10 Claims, 3 Drawing Sheets

METHODS OF WRITING PARTIAL PAGE DATA IN A NON-VOLATILE MEMORY DEVICE

CROSS-REFERENCE TO RELATED PATENT APPLICATION

This application claims the benefit of and priority to Korean Patent Application No. 10-2007-0015091, filed on Feb. 13, 2007, in the Korean Intellectual Property Office, the disclosure of which is incorporated herein by reference as if set forth in its entirety.

BACKGROUND OF THE INVENTION

1. Field of the Invention

The present invention relates to methods of writing data in a non-volatile memory device, and, more particularly, to methods of writing partial page data in a non-volatile memory device.

2. Description of the Related Art

A non-volatile memory device can preserve stored data even when power is not supplied thereto. A common example of a non-volatile memory device is a flash memory device.

Generally, data is written in a flash memory device in units of page. In some cases, partial page data is written instead of data in page units, that is, the flash memory device receives the partial page data from a host.

Recently, to increase the integration of a flash memory device, multi-level flash memory devices that store multi-bit data in one memory cell have been developed. Accordingly, a memory cell that stores multi-bit data is referred to as a multi-level cell, and a memory cell that stores single-bit data is referred to as a single-level cell.

However, if data can be written only once in a multi-level cell, a problem may occur because data cannot be written on a page in which partial page data has already been written.

SUMMARY

Embodiments of the present invention may provide a method of writing partial page data in a non-volatile memory device. Accordingly, data read from another data block can be written in the remaining part of a page that cannot be fully written with the partial page data.

According to some embodiments of the present invention, there is provided a method of writing partial page data in a non-volatile memory device, including: reading data from a second block when the size of a last page of data to be written in a page of a first block is smaller than a size of the page of the first block, wherein a size of the read data is given by the size of the page of the first block minus the size of the last page of data; storing together data of the last page and the data read from the second block in a buffer; and writing the data stored in the buffer in the first block.

In other embodiments, the data stored in the buffer may be written on one page of the first block. The page size of the first block may be equal to the sum of the last page size of the data to be written and the data size read from the second block.

The size of the buffer may be equal to the page size of the first block.

In still other embodiments, the read data from the second block may be located outside of an area in the first block where partial page data to be written is to be stored.

The buffer may be a Static Random Access Memory (SRAM) buffer located externally from the non-volatile memory device.

The buffer may be a data resister within the non-volatile memory device.

The first block may be a log block and the second block may be a data block.

The non-volatile memory device may be a NAND-Flash memory device.

According to further embodiments of the present invention, there is provided a method of writing partial page data in a non-volatile memory device, including: reading data from a second block when the size of a last page of data to be written in a page of a first block is smaller than a size of the page of the first block, wherein a size of the read data is given by the size of the page of the first block minus the size of the last page of data; and writing together the data of the last page and the data read from the second block in one page of the first block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS OF THE INVENTION

Figure 1:
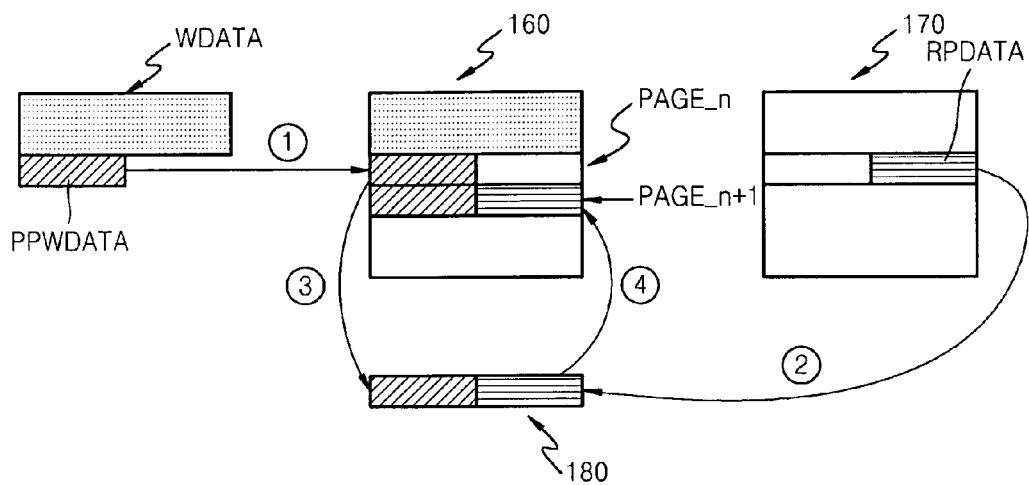
FIG. 1 is a diagram that illustrates a method of writing partial page data, which is compared to the method of writing partial page data according to an embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram that illustrates a method of writing partial page data, which is compared to the method of writing partial page data according to some embodiments of the present invention.

Referring to FIG. 1, partial page data PPWDATA is written on a page PAGE_n of a log block 160 in operation 1. Except for a part on which the partial page data PPWDATA is written, the remaining part of the page PAGE_n is empty. In operation 2, data RPDATA, which is stored in a part that excludes the partial page data PPWDATA, is read from a data block 170 and then stored in a buffer 180. In operation 3, the partial page data PPWDATA written in the log block 160 is stored in the buffer 180. The buffer 180 is filled with the partial page data PPWDATA and the data RPDATA read from the data block 170. In operation 4, the data PPWDATA and RPDATA stored in the buffer 180 are written to a page PAGE_n+1 of the log block 160. The page PAGE_n+1 is different from the page PAGE_n on which the partial page data PPWDATA is initially written.

In the above-described method of writing partial page data, a write operation and a read operation are performed two times, respectively. To be more specific, in operation 1, a first write operation is performed in the log block 160. In operation 2, a first read operation is performed from the data block 170. In operation 3, a second read operation is performed from the log block 160. In operation 4, a second write operation is performed in the log block 160.

Figure 2:
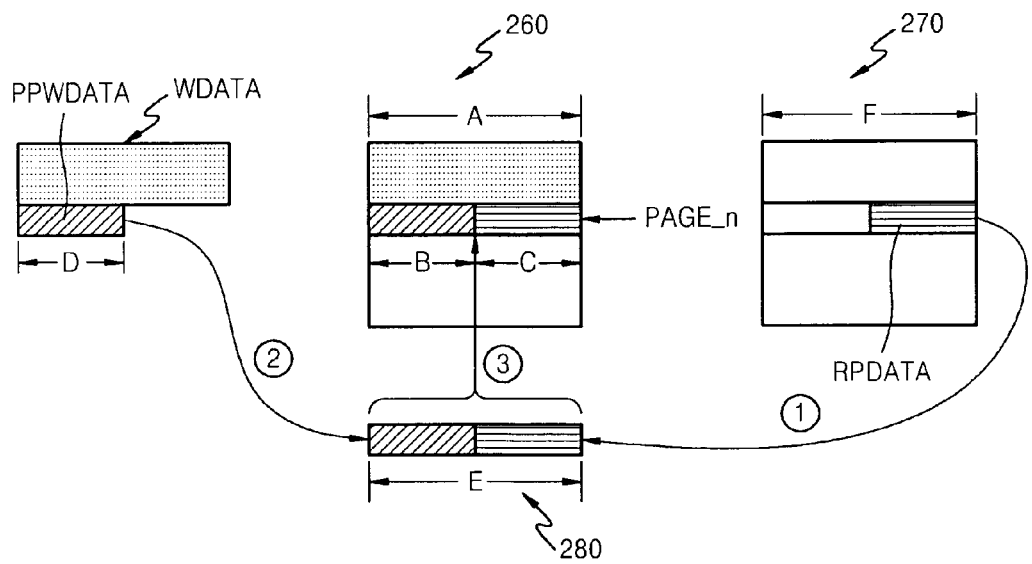
FIG. 2 is a diagram that illustrates a method of writing partial page data according to some embodiments of the present invention.

FIG. 2 is a diagram that illustrates a method of writing partial page data according to some embodiments of the present invention.

Figure 3:
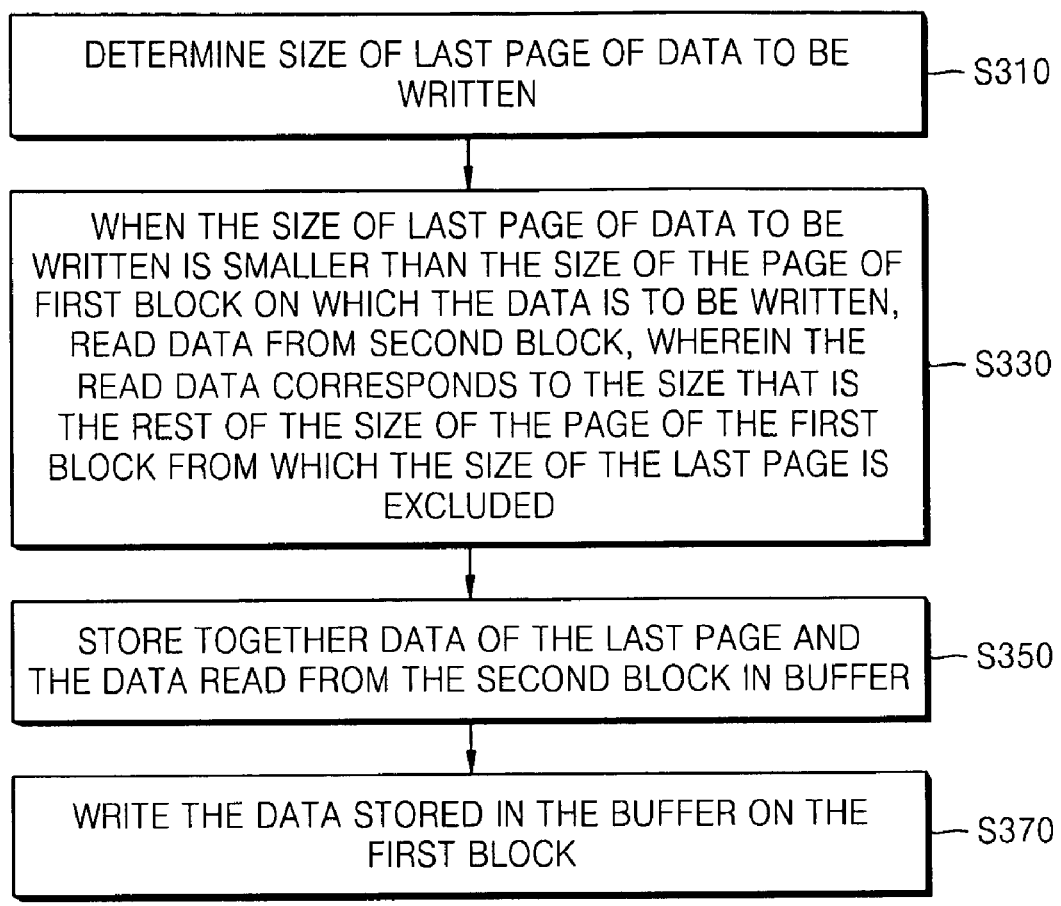
FIG. 3 is a flowchart that illustrates a method of writing partial page data, according to some embodiments of the present invention.

FIG. 3 is a flowchart that illustrates a method of writing partial page data, according to some embodiments of the present invention.

Hereinafter, partial page data PPWDATA refers to the case where a last page size D of the data WDATA to be written is smaller than a page size A of a first block 260 to which the data WDATA is to be written.

Referring to FIG. 2 and FIG. 3, in the method of writing partial page data according to some embodiments of the present invention, when a non-volatile memory device receives a request for writing partial page data PPWDATA, data RPDATA having size C, which represents the rest of the page size A of the first block 260 from which the last page size D of the data WDATA to be written is excluded, is read from a second block 270 and then stored in a buffer 280 (S330: operation 1). The partial page data PPWDATA of the last page and the data RPDATA read from the second block 270 are stored together in the buffer 280 (S350: operation 2). Then, the data PPWDATA and RPDATA stored in the buffer 280 are written in the first block 260 (S370: operation 3).

The first block 260 may be a log block and the second block 270 may be a data block in accordance with various embodiments of the present invention.

In the operation of reading data from a second block (S330), the data RPDATA may be read from the second block 270, wherein the data RPDATA is located outside of an area where the partial page data PPWDATA is to be written. For example, as shown in FIG. 2, when the partial page data PPWDATA is stored in a front part of a page PAGE_n of the first block 260, the data RPDATA written in a rear part of the page PAGE_n corresponding to the second block 270 is read.

In the operation of writing data in a first block (S370), the data PPWDATA and RPDATA stored in the buffer 280 may be written in one page PAGE_n of the first block 260. That is, the partial page data PPWDATA of the last page of the data WDATA to be written and the data RPDATA read from the second block 270 may be written together in one page PAGE_n of the first block 260.

The page size A of the first block 260 may be equal to the sum of the last page size D of the data WDATA to be written and the size C of the data RPDATA read from the second block 270.

A size E of the buffer 280 may be equal to the page size A of the first block 260. Also, the size E of the buffer 280 may be equal to a page size F of the second block 270.

The buffer 280 may be a Static Random Access Memory (SRAM) buffer.

In further embodiments of the present invention, writing partial page data may further include an operation of determining a size (that is a size D of the partial page data) of the last page of the data WDATA to be written (S310). In this case, in the operation of reading data from a second block (S330), the data RPDATA having the size C is read from the second block 270 by using the determined size D of the partial page data.

The method of writing the partial page data according to the embodiments of FIGS. 2 and 3 require only a single write operation and a single read operation. To be more specific, in the operation of reading data from a second block (S330), a first read operation is performed from the second block 270. In the operation of writing data on a first block (S370), a first write operation is performed in the first block 260. On the other hand, as described above with respect to FIG. 1, the comparative method of writing partial page data requires two write operations and two read operations.

Accordingly, compared to the comparative method of writing partial page data in FIG. 1, the method of writing partial page data according to some embodiments of the present invention can be performed using only one write operation and read operation.

Also, in the comparative method of writing partial page data in FIG. 1, an invalid page may exist. Referring to FIG. 1, an empty area exists in the page PAGE_n on which the partial page data PPWDATA is initially written. On the other hand, in the method of writing partial page data according to some embodiments of the present invention, no invalid page is generated.

Figure 4:
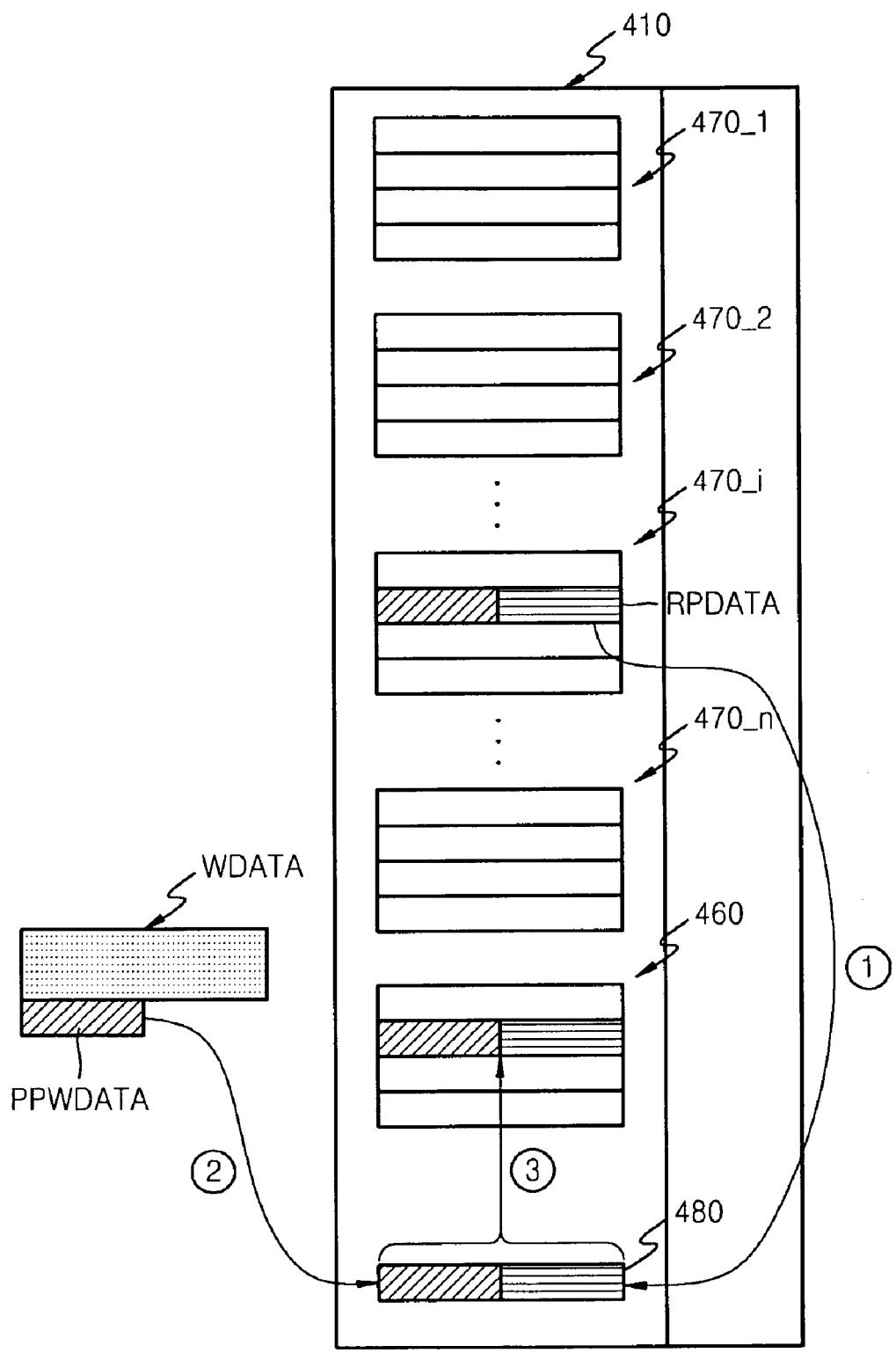
FIG. 4 is a diagram that illustrates a method of writing partial page data according to further embodiments of the present invention.

FIG. 4 is a diagram that illustrates a method of writing partial page data according to further embodiments of the present invention.

The method of writing partial page data according to the embodiments of FIG. 4 may be applied to a non-volatile memory device including a data resister. According to the embodiments of FIG. 4, a data resister 480 within the non-volatile memory device performs as the buffer 280 in the method of writing partial page data according to the embodiments of FIGS. 2 and 3.

The method of writing partial page data according to the embodiments of FIG. 4, except for the use of the data resister, is the same as the method of writing partial page data according to the embodiments of FIGS. 2 and 3, and includes the same operations with respect to writing partial page data.

In the method of writing partial page data according to the embodiments of FIG. 4, partial page data PPWDATA and RPDATA read from a second block 470_i are stored together in the data resister 480. Then, the data PPWDATA and RPDATA stored in the data resister 480 are written to a first block 460.

In the method of writing partial page data according to the embodiments of FIGS. 2 and 3, partial page data is written by using a buffer externally located from a non-volatile memory device. Thus, a write/read path is formed over both the inside and outside of the non-volatile memory device. On the other hand, in the method of writing partial page data according to the embodiments of FIG. 4, partial page data can be written without using a buffer externally located from a non-volatile memory device. Thus, a write/read path can be formed inside of the non-volatile memory device.

As described above, in the method of writing partial page data according to various embodiments of the present invention, a part of a page that is not entirely written with partial page data is filled in with data read from other data block. Thus, the partial page data can be efficiently written.

While the present invention has been particularly shown and described with reference to exemplary embodiments thereof, it will be understood by those of ordinary skill in the art that various changes in form and details may be made therein without departing from the spirit and scope of the present invention as defined by the following claims.

That which is claimed:

1. A method of writing partial page data in a non-volatile memory device, comprising:
   determining a size of a last page of data to be written in a page of a log block, the size of the last page of data being variable;
   reading data from a data block when the size of the last page of data to be written in the page of the log block is smaller than a size of the page of the log block, wherein a size of the read data is given by the size of the page of the log block minus the size of the last page of data;
   storing together data of the last page and the data read from the data block in a volatile buffer located externally from the non-volatile memory device; and
   writing the data stored in the volatile buffer from the volatile buffer into one page of the log block;
   wherein the page size of the log block is equal to a sum of the size of the last page size of the data to be written and the size of the data read from the data block; and
   wherein the last page of data is written in the log block after the storing together data of the last page and the data read from the data block.

2. The method of claim 1, wherein a size of the volatile buffer is equal to the page size of the log block.

3. The method of claim 1, wherein the size of the volatile buffer is the equal to a page size of the data block.

4. The method of claim 1, wherein the read data from the data block is located outside of an area in the log block in which partial page data of data to be written is to be stored.

5. The method of claim 1, further comprising determining the size of the last page of the data to be written.

6. The method of claim 1, wherein the volatile buffer is a Static Random Access Memory (SRAM).

7. The method of claim 1, wherein the volatile buffer is a data register located within the non-volatile memory device.

8. The method of claim 1, wherein the log block is a log block and the data block is a data block.

9. The method of claim 1, wherein the non-volatile memory device is a NAND-Flash memory device.

10. The method of claim 1, wherein the non-volatile memory device comprises a multi-level flash memory cell storing n-bit data.

* * * * *